Oct. 9, 1951 — L. A. ROWE — 2,570,863
LOCK NUT
Filed Oct. 12, 1945 — 2 Sheets-Sheet 1

INVENTOR.
Lawrence A. Rowe
BY
Albert G. McCaleb
Atty.

Oct. 9, 1951  L. A. ROWE  2,570,863
LOCK NUT
Filed Oct. 12, 1945  2 Sheets-Sheet 2
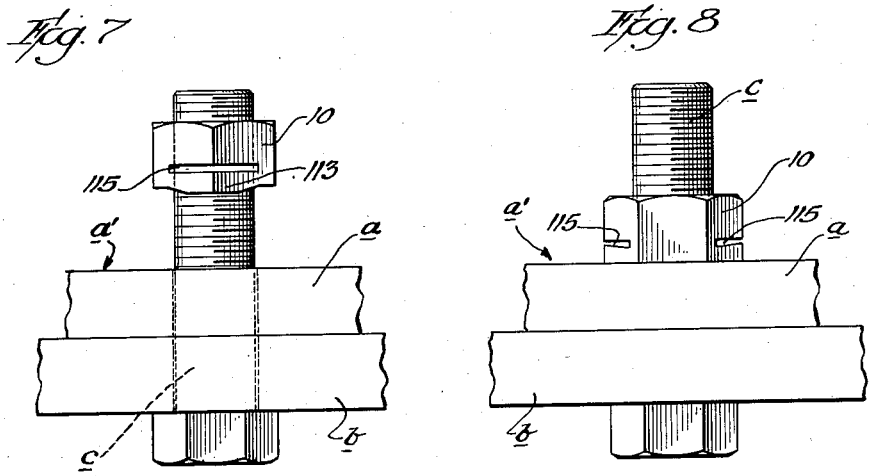
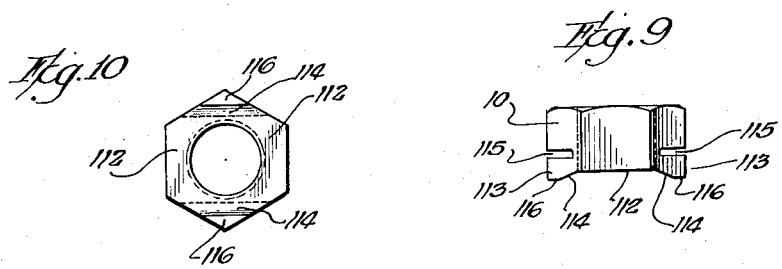
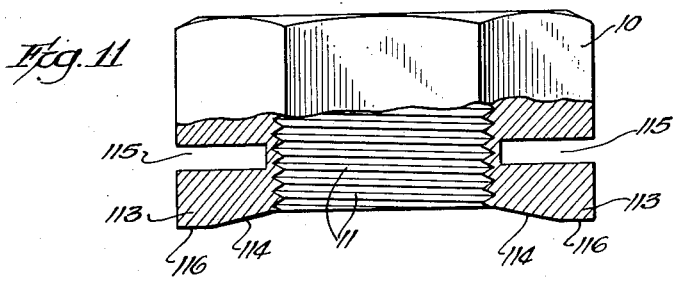
INVENTOR.
Lawrence A. Rowe
BY
Albert G. McCaleb
Atty.

Patented Oct. 9, 1951

2,570,863

UNITED STATES PATENT OFFICE 2,570,863

LOCK NUT

Lawrence A. Rowe, Oak Park, Ill., assignor to MacLean-Fogg Lock Nut Company, Chicago, Ill., a corporation of Illinois Application October 12, 1945, Serial No. 621,952

2 Claims. (Cl. 151—21)

My invention contemplates and provides an improved locknut.

An object of my present invention is to provide a practical free spinning unitary locknut.

Another object is to provide such a locknut that will function satisfactorily within all allowable variations of the pitch diameters of the bolts with which it may cooperate, it being recognized that on commercial bolts pitch diameters vary considerably within tolerances allowed in their manufacture.

Another object is to so construct the locknut that all wrench torque applied to it is available for creating bolt tension.

A further object is to so construct the locknut that it will afford visual indication as to whether or not its associated bolt has been placed under sufficient tension.

Still another object is to so construct the locknut that, when applied, its effective thrust face may be of maximum area.

Yet another object is to so construct the locknut that, when wrenched home to a surface against which its bolt-tensioning thrust is exerted, it will crowd its own metal into the bolt thread completely to fill that thread in substantially diametrically opposite regions, and by so doing create an effective and dependable lock at right angles to the bolt axis.

In the accompanying sheets of drawings, whereto reference is made in the following detailed description:

Figs. 7, 8, 9 and 10 are views, generally corresponding to Figs. 1, 2, 3 and 4, depicting a modified form of my new locknut; and Fig. 11 is a side view, partly in elevation and partly in axial section, of such modified form of my new locknut.

Similar characters of reference refer to similar parts throughout the several views.

Figure 1:
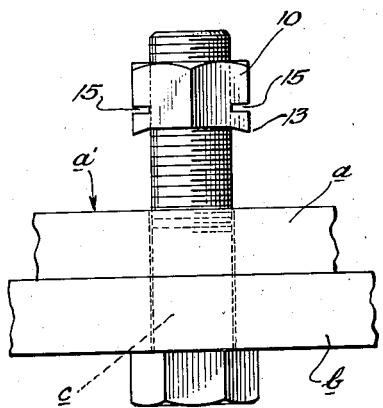
Fig. 1 is a side elevational view of my new locknut as it appears while still capable of being freely spun on a bolt with which it has been associated.

Let us refer first to Figs. 1, 3, 4 and 5.

The nut body, indicated at 10, may be formed from hexagonal or other suitable bar stock and has its axial bore provided with a standard or other thread 11 appropriate to the size and type of bolt with which the nut is to cooperate.

The nut body is provided with a flat thrust face 12 occupying a plane normal to the bolt axis. The contiguous end of the threaded bore of the nut lies within the boundaries of such thrust face 12. At diametrically opposite edges thereof, such thrust face 12 is provided with parallel symmetrically disposed ridges 13, each such ridge 13 preferably having a plane surface 14 inclining away from the thrust face 12 outwardly from a line spaced from but adjacent to the threaded bore of the nut, and forming an edge with one of the sides of the nut body. Thus, the section of each such ridge 13 preferably resembles a right angle triangle having its hypotenuse defined by one of the surfaces 14.

Spaced from and aligned with the ridges 14 are parallel slots 15 which have been broached or otherwise suitably formed in the nut body. These slots 15 do not intersect the threaded bore of the nut. The opposed walls of each slot 15 are preferably, but not necessarily, parallel with each other and the flat thrust face 12. At a point intermediate its ends the third wall of each such slot 15 is spaced from but lies closely adjacent to the threaded bore of the nut.

The distance $x$ between opposed walls of the slots 15 is preferably somewhat greater than the distance $y$ between the plane of the thrust face 12 and the edges which the surfaces 14 of the ridges 13 form with the contiguous sides of the nut body.

Figure 2:
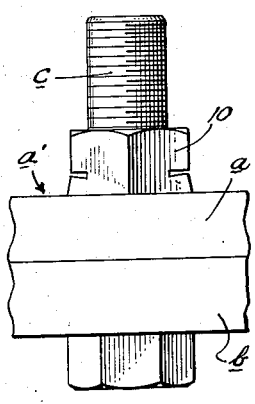
Fig. 2 is a view similar to Fig. 1, but illustrating the nut as it appears after functioning to create an effective and dependable lock between itself and the bolt.
Figure 3:
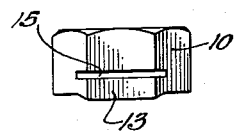
Fig. 3 is an isolated side elevational view of the nut.
Figure 4:
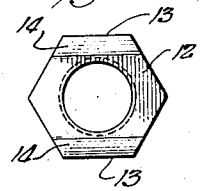
Fig. 4 is a bottom plan view of the nut.
Figure 5:
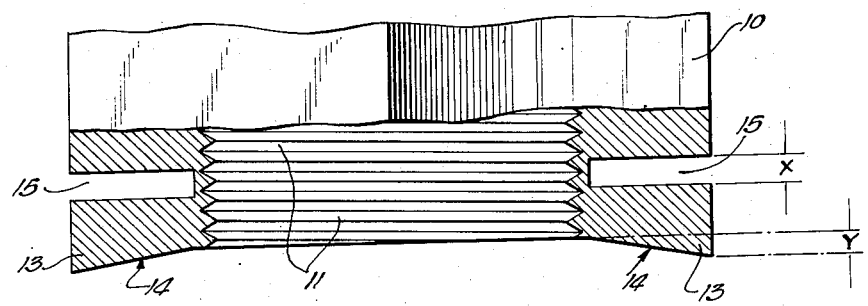
Fig. 5 is an enlarged fragmentary view, partly in axial section, depicting the lower portion of the nut as it appears before being applied to a bolt.
Figure 6:
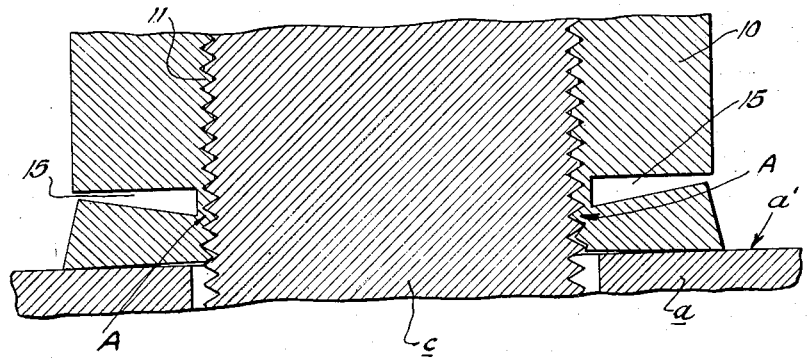
Fig. 6 is an enlarged fragmentary view, partly in axial section, depicting the nut after it has been wrenched home to put an associated bolt under proper tension and to lock itself to such bolt.

In Figs. 1 and 2, reference letters $a$ and $b$ indicate plates or other members through which extends a bolt $c$ for cooperation with one of my new locknuts. Bolt $c$ and member $a$ also appear in Fig. 6; member $a$ having a plane surface $a'$ against which the nut may exert its thrust when wrenched properly to tension bolt $c$.

The cooperating threads of the nut and bolt are so related that the nut, as applied in Fig. 1, will spin freely on the bolt until the ridges 13 engage the opposed surface, e. g., the surface $a'$, against which the nut is to exert its thrust in tensioning the bolt. Then and then only is wrench torque necessary.

As the nut is wrenched home properly to tension the bolt, the ridges 13 and adjacent portions of the nut body are forced in the axial direction of the nut, and also are rocked toward the nut axis, to close or nearly close the initially open sides of the slots 15, and to permit the surfaces 14 of the ridges 13 to assume or closely approach the plane of the flat thrust face 12, and to permit such face 12 directly to contact the opposed surface, e. g., surface a', against which the nut exerts its thrust.

As the ridges 13 and their adjacent portions of the nut body are forced in the axial direction of the nut and rocked toward the nut axis, as just described, portions A of the nut thread are crowded into the bolt thread completely to fill the bolt thread in substantially diametrically opposite regions of the bolt, thereby creating an effective and dependable lock acting transversely of and substantially at right angles to the bolt axis. The creation of such lock is facilitated due to the circumstance that the metal of the nut body yields to deflection most readily in the regions where the slots 15 most closely approach the threaded bore of the nut.

The optimum condition of the nut, when properly wrenched home to the surface against which it exerts its thrust, is one in which the surfaces 12 and 14—14 occupy a common plane in contact with the surface against which the nut exerts its thrust, and in which the open sides of the slots are nearly but not quite closed as a visual indication that appropriate tensioning of the bolt and the proper locking of the nut to the bolt have been accomplished.

Let us now refer to Figs. 7 to 11 which depict the modified form of my new locknut.

In this modified form of my locknut the slots 115 are broached or otherwise cut across opposite corners of the nut body, as distinguished from being broached or otherwise cut across opposite faces of the same. Flat surfaces 116, which conveniently but not necessarily are triangular, are formed on ridges 113 aligned with the slots 115, and said surfaces 116 occupy a plane parallel with but spaced from the flat thrust face 112. A plane surface 114 inclines away from each flat surface 116 to join the thrust face 112 at a line spaced from but adjacent to the threaded bore of the nut. Other than with respect to the features just noted, the locknut of Figs. 7 to 11 need not differ from the one of Figs. 1 to 6. The two locknuts function in substantially the same manner to afford substantially the same advantages in accomplishing substantially the same results.

While my drawings depict hexagonal nuts made in a described manner, the same general constructions may be applied to any polyfaced nuts having opposed side faces and made either hot or cold by any method of manufacture.

Having thus illustrated and described nut structures by which I have attained the objects set forth at the beginning of this specification, what I claim as new and desire to secure by Letters Patent of the United States is:

1. A unitary locknut for a bolt having continuous and uninterrupted threads, comprising a nut body having an axial bore provided with a continuous and uninterrupted thread, a flat face extending longitudinally entirely across the nut body and laterally beyond said axial bore and which occupies a plane normal to the nut axis and that is presentable to a surface against which the nut exerts its thrust when tensioning an appropriate bolt, relatively narrow ridges projecting away from two opposite sides of said face, having oppositely inclined smooth trapezoidal faces out of alignment with said flat face, the trapezoidal faces having their innermost edges and most remote edges relative to the axis of the body in parallel relation to each other and to said opposite sides of the body, said body having oppositely disposed peripherally separated segmental slots each aligned axially of the nut body with one of said ridges, said slots each being of relatively uniform width axially of the nut, opening laterally of the nut, extending into the nut body toward the nut axis, stopping short of the bore of the nut, but having the inner said walls thereof straight and parallel with each other, said inner side walls lying in close proximity to the threaded bore of the nut, said nut, when wrenched home to its final position against said surface by axial movement on said bolt, having the inclined smooth faces of said ridges in alignment with said flat face and having the parts of the nut threads adjacent the inner side walls of said slots crowded into the bolt threads to positively lock the nut to the bolt and prevent rotation of the nut with respect to the bolt.

2. A unitary locknut as defined in claim 1 and wherein the recited face occupies a plane disposed at right angles to the nut axis and the slots are of such width that their open sides are not completely closed when the ridges have been forced into the plane of said face.

LAWRENCE A. ROWE.

REFERENCES CITED

The following references are of record in the file of this patent:

UNITED STATES PATENTS

| Number | Name | Date |
|---|---|---|
| 168,597 | Atwood | Oct. 11, 1875 |
| 1,464,591 | Weichold | Aug. 14, 1923 |
| 2,003,591 | Hayden | June 4, 1935 |
| 2,495,409 | Costello | Jan. 24, 1950 |

FOREIGN PATENTS

| Number | Country | Date |
|---|---|---|
| 1,141 | Great Britain | 1886 |
| 284,407 | Great Britain | Jan. 30, 1928 |
| 7,767 | Great Britain | 1903 |
| 280,273 | Great Britain | Nov. 10, 1927 |